(12) United States Patent
Wigger et al.

(10) Patent No.: US 7,874,580 B2
(45) Date of Patent: Jan. 25, 2011

(54) AIRBAG DEVICE FOR A MOTOR VEHICLE

(75) Inventors: Henning Wigger, Detroit, MI (US); Michael Debes, Aschaffenburg (DE); Frank Wollny, Berlin (DE); Andre Buchholz, Berlin (DE); Wolfgang Kampfmann, Eschau (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/314,253

(22) Filed: Dec. 5, 2008

(65) Prior Publication Data

US 2009/0146401 A1 Jun. 11, 2009

Related U.S. Application Data

(63) Continuation of application No. PCT/EP2007/054484, filed on May 9, 2007.

(30) Foreign Application Priority Data

Jun. 7, 2006 (DE) ................... 20 2006 009 205 U

(51) Int. Cl.
  *B60R 21/205* (2006.01)
  *B60R 21/20* (2006.01)
(52) U.S. Cl. ................. 280/732; 280/728.1; 280/728.3; 280/731
(58) Field of Classification Search ............. 280/728.1, 280/728.3, 731, 732
  See application file for complete search history.

(56) References Cited

U.S. PATENT DOCUMENTS

| | | | |
|---|---|---|---|
| 3,778,085 A | 12/1973 | Lipkin | |
| 4,842,300 A | 6/1989 | Ziomek et al. | |
| 5,013,064 A | 5/1991 | Miller et al. | |
| 5,060,972 A | 10/1991 | Satoh et al. | |
| 5,265,904 A | 11/1993 | Shelton et al. | |

(Continued)

FOREIGN PATENT DOCUMENTS

DE 39 10 337 A1 10/1989

(Continued)

OTHER PUBLICATIONS

Russian examination report issued Dec. 9, 2009 in corresponding Russian application No. 2008151421/11(067520); 4 pages.

(Continued)

*Primary Examiner*—Paul N. Dickson
*Assistant Examiner*—Barry Gooden, Jr.
(74) *Attorney, Agent, or Firm*—Foley & Lardner LLP

(57) ABSTRACT

An airbag device for a vehicle, including an airbag package, a receptacle, and a flexible protective covering for the airbag. The flexible protective covering includes at least two flexible, sheet-like protective elements secured to the receptacle. The flexible, sheet-like protective elements are connected to one another via at least one separable tearing line. The flexible, sheet-like protective elements flank the airbag during initial inflation and expansion of the airbag. A flexible guide layer is arranged between the protective covering and the airbag package. The flexible guide layer is permanently connected to a first of the sheet-like protective elements, such that the first sheet-like protective element, together with the guide layer, forms a composite layer flanking the airbag during inflation.

36 Claims, 3 Drawing Sheets

U.S. PATENT DOCUMENTS

| | | | |
|---|---|---|---|
| 5,348,343 A | 9/1994 | Hawthorn | |
| 5,429,385 A * | 7/1995 | Kamiji et al. | 280/728.3 |
| 5,447,329 A | 9/1995 | Hamada | |
| 5,603,523 A | 2/1997 | Rhule et al. | |
| 5,772,239 A | 6/1998 | Seymour | |
| 5,810,385 A | 9/1998 | Henseler et al. | |
| 6,099,028 A | 8/2000 | Seifert | |
| 6,131,944 A | 10/2000 | Henkel et al. | |
| 6,164,685 A | 12/2000 | Fischer et al. | |
| 6,206,409 B1 | 3/2001 | Kato et al. | |
| 6,390,500 B1 * | 5/2002 | Yamada et al. | 280/743.1 |
| 6,457,744 B1 * | 10/2002 | Tonooka | 280/732 |
| 6,474,688 B1 | 11/2002 | Bogren et al. | |
| 6,533,314 B2 * | 3/2003 | Merrifield et al. | 280/728.3 |
| 6,692,017 B2 | 2/2004 | Taoka et al. | |
| 6,874,810 B2 * | 4/2005 | Soderquist | 280/728.3 |
| 6,877,772 B2 | 4/2005 | Fischer et al. | |
| 7,232,151 B2 | 6/2007 | Hayashi et al. | |
| 7,290,791 B2 * | 11/2007 | Tracht | 280/730.2 |
| 2003/0218323 A1 | 11/2003 | Berbalk | |

FOREIGN PATENT DOCUMENTS

| | | |
|---|---|---|
| DE | 40 27 996 A1 | 4/1991 |
| DE | 42 20 499 A1 | 1/1994 |
| DE | 43 42 440 C2 | 7/1994 |
| DE | 44 19 565 A1 | 3/1995 |
| DE | 195 36 603 A1 | 4/1997 |
| DE | 297 11 679 U1 | 10/1997 |
| DE | 197 24 170 A1 | 1/1998 |
| DE | 196 31 556 C1 | 2/1998 |
| DE | 198 38 815 A1 | 3/1999 |
| DE | 198 13 054 A1 | 10/1999 |
| DE | 198 24 735 A1 | 12/1999 |
| DE | 199 41 442 A1 | 5/2000 |
| DE | 202 07 860 U1 | 11/2002 |
| DE | 103 16 272 A1 | 11/2004 |
| DE | 10 2004 023 780 A1 | 6/2006 |
| EP | 0 761 507 B1 | 5/2000 |
| EP | 0 945 312 B1 | 12/2003 |
| EP | 1 219 507 B1 | 7/2006 |
| EP | 1 547 877 B1 | 11/2008 |
| GB | 2 236 082 | 3/1991 |
| JP | 9-301013 A | 11/1997 |
| JP | 2003-137054 A | 5/2003 |
| RU | 1788191 A1 | 1/1993 |
| RU | 2 144 877 C1 | 1/2000 |

OTHER PUBLICATIONS

European examination report issued on Sep. 1, 2009 in corresponding European application No. 07728936.1-1264; 6 pages.

Chinese examination report issued for CN No. 200780010822.6, issued Apr. 1, 2010, 5 pages.

Russian Decision issued for RU No. 2008151421/11 (067520); issued Apr. 8, 2010, 10 pages.

* cited by examiner

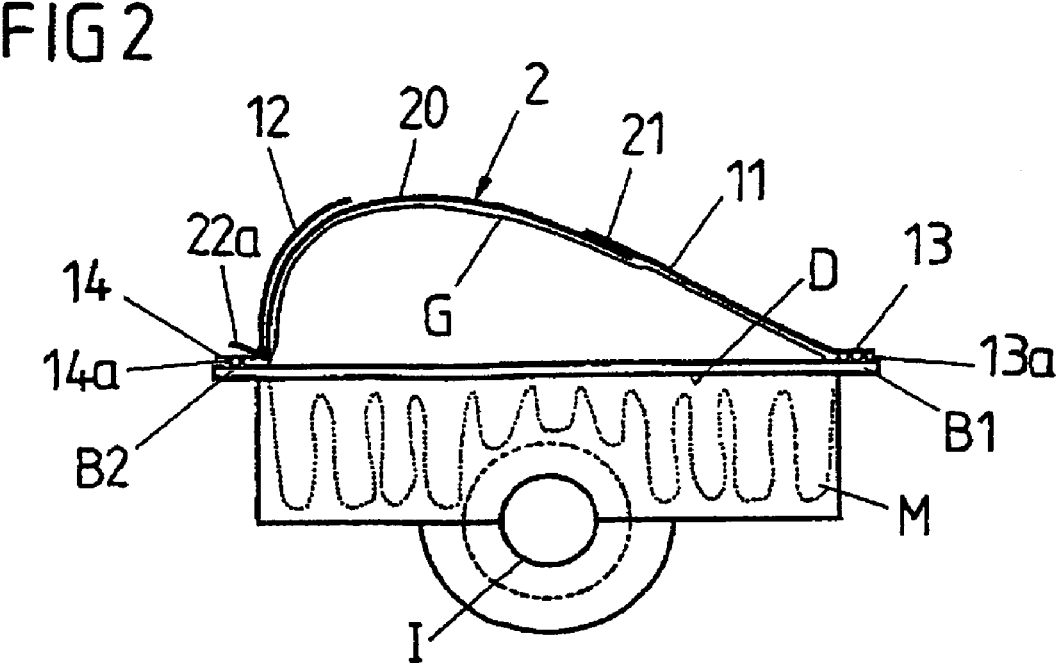
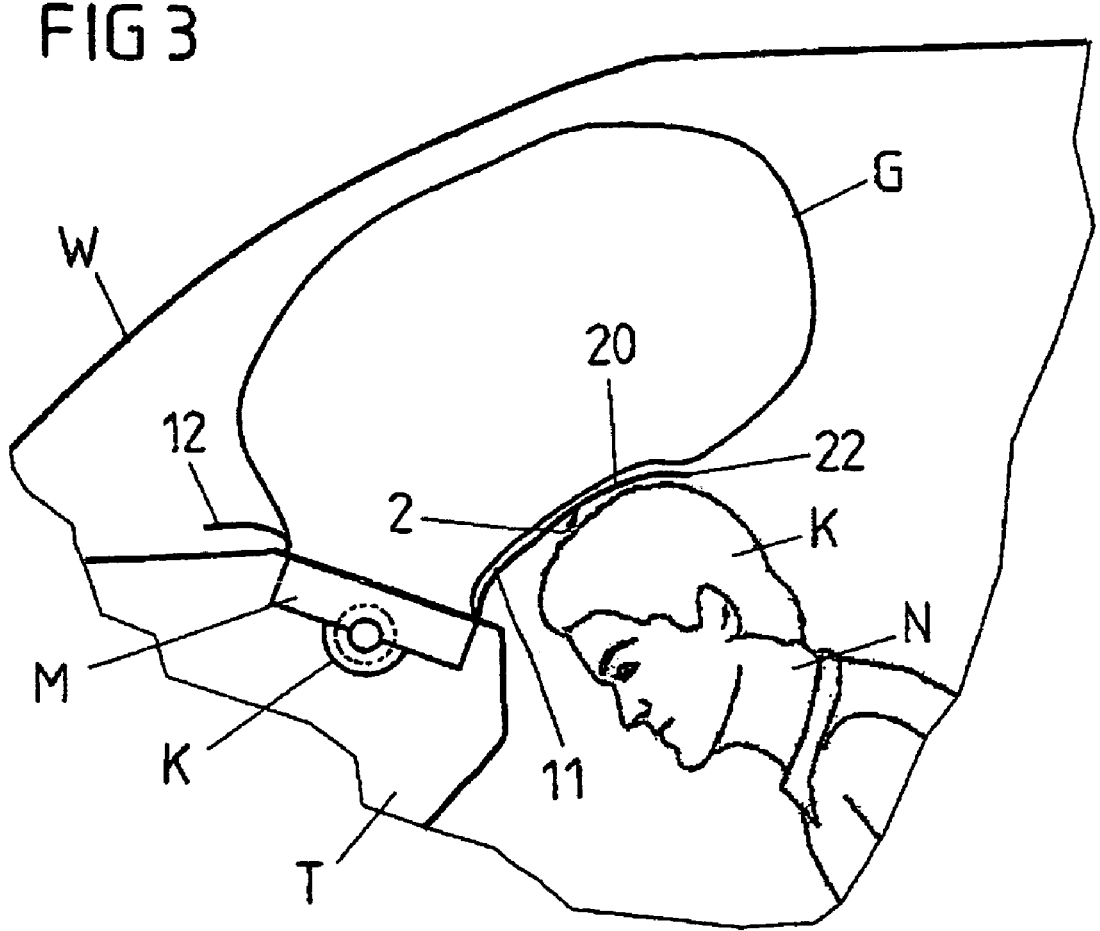

AIRBAG DEVICE FOR A MOTOR VEHICLE

CROSS-REFERENCE TO RELATED PATENT APPLICATIONS

This application is a Continuation of International Patent Application No. PCT/EP2007/054484, filed May 9, 2007, which was published in German as WO 2007/141107 and is incorporated herein by reference in its entirety.

BACKGROUND AND SUMMARY

The present application relates generally to the field of an airbag device for a motor vehicle.

One disclosed embodiment relates to an apparatus for an airbag device for a motor vehicle, including an airbag, a receptacle, and a flexible protective covering. The airbag may be inflated to protect a vehicle occupant. Additionally, the airbag may be arranged within the receptacle as an airbag package. The receptacle includes an outlet opening through which the airbag may emerge during inflation expand. The flexible protective covering covers the airbag package in the region of the outlet opening. The flexible protective covering includes at least two flexible, sheet-like protective elements secured to the receptacle. The flexible, sheet-like protective elements are connected to one another via at least one separable tearing line. Further, the flexible, sheet-like protective elements flank the airbag during initial inflation and expansion of the airbag. Additionally, between the protective covering and the airbag provided as an airbag package, a flexible guide layer is arranged. The flexible guide layer is permanently connected to a first of the sheet-like protective elements, such that the first sheet-like protective element, together with the guide layer, forms a composite layer flanking the airbag during inflation. Further, the guide layer is permanently connected to the first sheet-like protective element along a connecting line that extends along the tearing line.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2 shows the arrangement of FIG. 1a when inflating and expanding an airbag received in the module housing, according to an exemplary embodiment;

FIG. 3 shows the arrangement of FIG. 1a, arranged on the passenger side of a motor vehicle, together with a vehicle occupant to be protected, with the already substantially inflated airbag, according to an exemplary embodiment.

DETAILED DESCRIPTION OF THE PREFERRED EMBODIMENTS

Figure 1A:
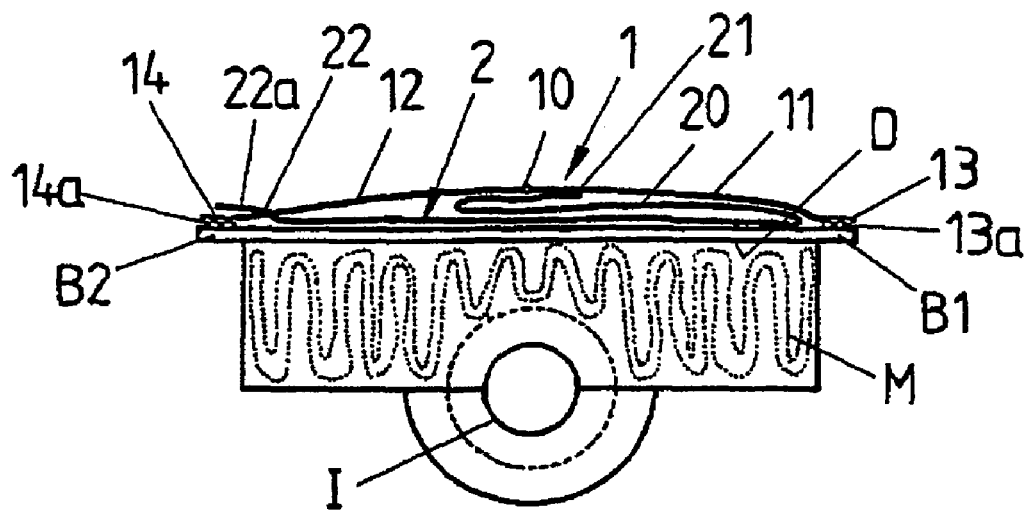
FIG. 1a is a schematic side view of an airbag device in the form of a passenger airbag module with a module housing closed by a protective covering, according to an exemplary embodiment.

An airbag device includes an airbag, and a receptacle. The airbag may be inflated by means of a gas generator to protect a vehicle occupant. The receptacle may be configured in the form of a module housing, such that the airbag is arranged as a folded and/or compressed airbag package within the receptacle. The receptacle may include an outlet opening (housing opening) such that, during inflation, the airbag is able to unfold by means of a gas generator. Thus, the airbag is able to expand into the external space outside the housing. The airbag module may additionally include a flexible protective covering that covers the airbag package in the region of the outlet opening.

The flexible protective covering may be used for the positioning and for retaining the airbag package inside the associated receptacle before inflation. Further, the flexible protective cover may be included for controlling the unfolding of the airbag during inflation. The flexible protective cover may also be included for avoiding damage to the airbag from reinforcing elements during expansion, namely on one edge of the associated receptacle (module housing).

It is known from DE 10 2004 023 780 A1, which is herein incorporated by reference in its entirety, to form the protective covering from two flexible, sheet-like protective elements (for example in the form of fabric layers). The flexible protective elements are fastened to fastening regions of the module housing that oppose one another (in a defined direction) and that are connected to one another via at least one separable tearing line. The flexible protective covering encompasses the airbag package in cross section in a U-shaped manner. Further, the flexible protective covering is separated during inflation along the separable tearing line into two separate flexible protective elements.

According to an exemplary embodiment, a tearing line of the protective covering is wherein the tearing line is less resistant to the loads (compressive forces) produced when the airbag is inflated than the remaining materials of which the protective covering consists. Therefore, as a result of compressive forces exerted on the flexible protective covering when the airbag is unfolded, the two flexible, sheet-like protective elements may be separated from one another along the tearing line without the sheet-like protective elements being damaged themselves. The separation may occur when a specific level of force and/or pressure is reached.

As a result of the guidance of the airbag during inflation by the at least two flexible, sheet-like protective elements, a specific unfolding and expansion of the airbag in a defined direction toward an occupant (for example a passenger) may be ensured. Further, an expansion in other directions (at least in the initial stage of expansion) that could result in endangering an occupant may be prevented. Thus, in the case of so-called OOP-positions, in which the occupant to be protected is located outside the normal position and/or very close to the corresponding airbag module, danger to an occupant may be lessened.

Such an airbag device is suitable, for example, for use as a passenger airbag module that is arranged behind the dashboard of a motor vehicle.

According to an exemplary embodiment, in an airbag device it is further provided that between the protective covering and the airbag, a flexible guide layer is included. For example, the flexible guide layer may be in the form of a film layer or fabric layer. Further, the flexible guide layer may be arranged such that the flexible guide layer is permanently connected to a (first) of the sheet-like protective elements. Thus, the first sheet-like protective element during inflation of the airbag forms, together with the flexible guide layer, a composite layer flanking the airbag.

Further, by a permanent connection of the guide layer to the first sheet-like protective element, a connection is created that remains maintained even if the two protective elements of the protective cover are separated from one another along the tearing line during inflation.

According to an exemplary embodiment, the composite layer formed from the flexible, sheet-like protective elements as well as an additional guide layer may be capable of greater expansion than the protective element. As a result, larger obstructions, such as the head of a vehicle occupant located too close to the airbag module, are covered during the inflation, unfolding and expanding of the airbag. More particularly, the unfolding airbag slides along the composite layer during expansion without coming into direct contact with the obstruction, namely the head of a vehicle occupant.

Further, since the composite layer has lower coefficient of friction when cooperating with the casing of the unfolding airbag, the airbag may slide along the composite layer. Thus, loading of the neck of the vehicle occupant may be reduced, compared to the loading that might occur with direct contact between the airbag and the head of a vehicle occupant. The coefficient of friction that characterizes the ratio of the frictional resistance (frictional force) to the normal force (force acting perpendicular to the direction of movement of the airbag along the composite layer on the airbag-composite layer material pairing) of the airbag-composite layer material pairing is preferably below 0.1. This may be achieved by coating the surface of the composite layer facing the airbag with a sliding layer (corresponding to a multi-layer design of the composite layer), or by constructing the composite layer entirely of a material that includes appropriate properties (single-layer design of the composite layer).

According to an exemplary embodiment, the guide layer is located between the airbag and the associated protective covering. As a result, the use of an additional guide layer for forming the enlarged flexible composite layer requires no intervention in the folding process of the airbag. Thus, the airbag may be inserted as a conventional pre-folded and/or compressed airbag package into a receptacle. More particularly, the airbag may be inserted into a module housing. The airbag may additionally be covered by the protective covering. Further, the guide layer may be connected to the protective covering so that that the guide layer is automatically positioned between the airbag package and the protective covering.

The at least two flexible, sheet-like protective elements of the protective covering are preferably secured to fastening portions of the receptacle of the airbag that oppose one another. The protective covering may be secured by bonding. The sheet-like protective elements are secured to the receptacle such that the sheet-like protective elements remain connected to the associated fastening portion of the receptacle during the unfolding and expansion of the airbag. Thus, the protective covering may separate along the tearing line.

After inflation and expansion of the airbag, the protective covering is separated into sheet-like protective elements. The protective elements flank the unfolding airbag on one respective side. The sheet-like protective elements are permanently connected to the guide layer, forming an enlarged composite layer. The casing of the unfolding airbag is able to slide along the enlarged composite layer during expansion.

For the purpose of forming a defined, enlarged composite layer, the guide layer is connected via a first end portion to the first sheet-like protective element. More particularly, the connection occurs adjacent to the tearing line of the protective covering along a connecting line that extends along the tearing line.

Additionally, the guide layer may be releasably fixed in the receptacle via a fixing portion. The fixing portion may be formed by a second end portion of the guide layer spaced apart from the first end portion. The first end portion may be provided for the connection with the protective covering. The releasable fixing of the guide layer may also occur on the protective covering and on a second sheet-like protective element. The second sheet-like protective element may differ from the first sheet-like protective element to which the guide layer is connected.

The releasable fixing of the guide layer inside the receptacle may be configured such that the guide layer may be released during inflation and expansion of the airbag. The fixing portion subsequently forms a free end of the composite layer flanking the airbag. The release of the fixing portion preferably takes place after the separation of the two sheet-like protective elements along the tearing line of the protective covering.

For the releasable fixing of the guide layer, a tearable fixing may be included. For example, a tear seam or an adhesive means with limited adhesive action may be included. Further, the tearable fixing used may be a positive fixing that is released by the forces produced during the unfolding of the airbag. More specifically, the tearable fixing may be configured in the form of at least one tab that penetrates an associated slot. Thus, the tab may be held with limited force and in a position such that the tab may be overcome in a nondestructive manner, thereby penetrating the slot. Additionally, the tab may include a widened portion that engages behind the slot.

According to an exemplary embodiment, the guide layer may be permanently connected to a first sheet-like protective element of the protective covering. The connection may be configured such that the composite layer formed during the inflation and expansion of the airbag, flanking the unfolding airbag, faces an occupant to be protected by the airbag. Thus, the flap may rest over a body part, such as the head of an occupant, when the occupant is located too close to the airbag during unfolding of the airbag.

Further, the expanded guide layers may be folded between the airbag and the protective covering. As a result, the expanded guide layers may form a large composite layer.

The tearing line of the protective covering may be formed by a material weakness of the protective covering. For example, the protective covering may include a perforation and/or a separable connection such as a seam between the two sheet-like protective elements.

The permanent connection between the first sheet-like protective element of the protective covering and the guide layer may be a material connection. The permanent connection may be created by bonding or welding. Additionally, the connection may be produced by a seam.

Figure 1B:
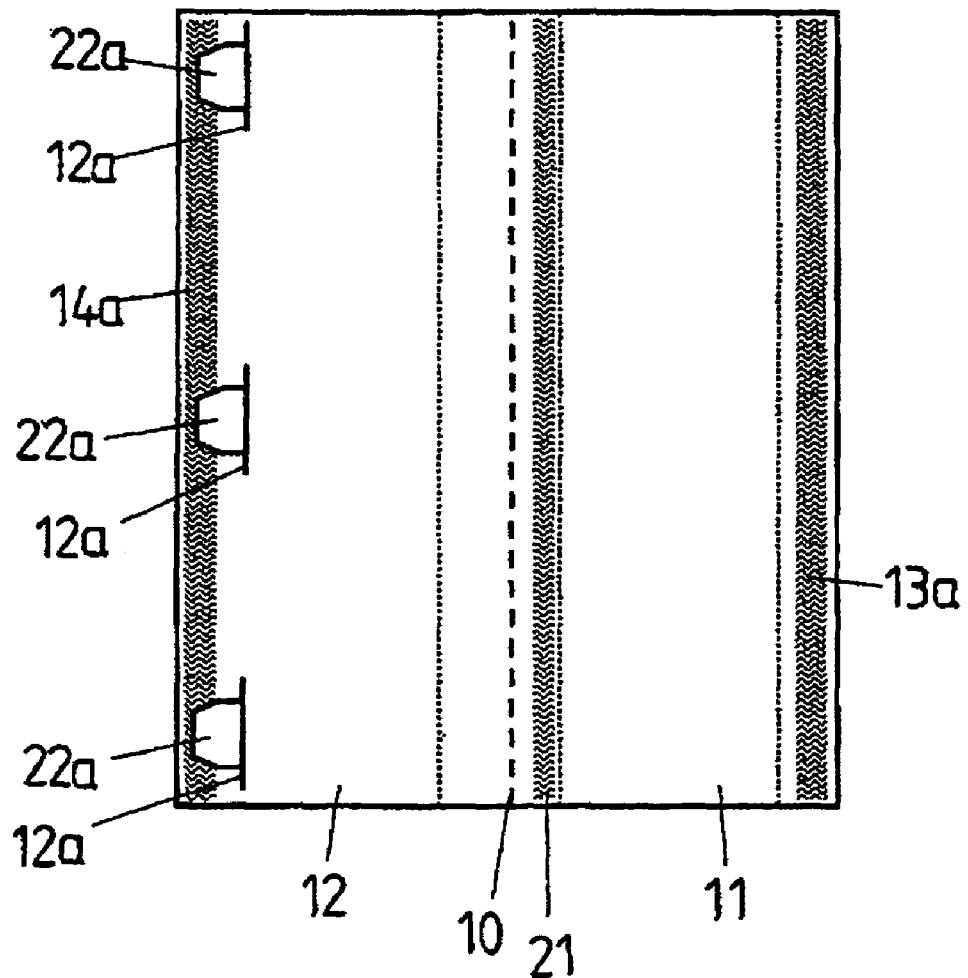
FIG. 1b is a plan view of the arrangement of FIG. 1a, according to an exemplary embodiment.

According to FIGS. 1a and 1b, an airbag device in the form of a passenger airbag module is shown in a side view (FIG. 1a) and a plan view (FIG. 1b), according to an exemplary embodiment. The airbag module includes a receiver in the form of a module housing M. In the module housing M, an airbag G is folded up to form an airbag package. Additionally, a gas generator (inflator I) for inflating the airbag G is included. On a side remote from the gas generator I, the module housing M has an exposed top surface D. The exposed top surface D forms an outlet opening (housing opening) such that the airbag may unfold and expand by means of the gas generator I during inflation. The outlet opening is covered and closed by means of a flexible protective covering 1. The flexible protective covering 1 is secured to two portions 13, 14 that oppose one another, respectively, by an adhesive means 13a, 14a. The flexible protective covering 1 is secured to a fastening portion B1, B2 of the module housing M.

In the central region between the two fastening portions B1, B2, a tearing line 10 is formed by a perforation. The tearing line 10 divides the flexible protective covering 1 into two flexible, sheet-like protective elements 11, 12 in the form of film layers. The tearing line 10 extends along the flexible protective covering 1.

On the first film layer 11 immediately adjacent to the tearing line 10 a sheet-like, flexible guide layer 2 is permanently connected (by bonding or welding) to an end portion 21 (connecting portion). The flexible guide layer 2 is connect such that the associated connecting line (on which the guide layer 2 is connected to the first sheet-like protective element 11) extends along the tearing line 10.

The other end portion 22 (fixing portion) of the guide layer 2 is releasably attached by tabs 22a that penetrate associated slots 12a of the second flexible, sheet-like guide element 12. The tabs 22a are held by means of clamping forces in a position such that they penetrate the respectively associated slot 12a. Thus, during assembly of the module, the module is pressed with the tab region against an element arranged in the dashboard of a motor vehicle. Alternatively, an additional clamping strip may be provided that is screwed to the housing and at the same time pressed onto the tabs 22a.

In the central portion 20 between the two end portions 21, 22, the guide layer 2 is folded. The guide layer 2 extends between the airbag G, that is compressed as an airbag package in the module housing M, and the protective covering 1 that closes the module housing M.

FIG. 2 shows a side view of the arrangement of FIG. 1a when inflating and expanding an airbag received in the module housing, according to an exemplary embodiment. When triggered by a crash, gas generator I ignites. As a result, gas generator I releases gases for filling the airbag G.

The airbag G is unfolded during inflation and expands through the outlet opening of the module housing M formed on the exposed top surface D, acting with its casing on the protective covering 1 and the guide layer 2. Due to the compressive forces associated with inflation, the flexible protective covering 1 is separated along the tearing line 10. More particularly, the flexible protective covering 1 is separated into two separate flexible, sheet-like protective elements 11, 12 (in the form of film layers). The flexible, sheet-like protective elements 11, 12 flank the unfolding and expanding airbag G, respectively, on one side (adjacent to the respective fastening portion B1, B2 on the module housing M).

Further, the flexible guide layer 2 is permanently connected with its first end portion 21 (connecting portion) to the first sheet-like protective element 11 (adjacent to the tearing line 10). Additionally, the flexible guide layer 2 is releasably fixed with a second end portion 22 (fixing portion) via fastening tabs 22a to the second sheet-like protective element 12 (in the region of the associated fastening portion B2).

During further inflation of the airbag G, the two flexible, sheet-like protective elements 11, 12 change direction to the outside. The associated fastening portions B1, B2 on the module housing M form a hinge line. Further, the airbag G is covered by the first sheet-like protective element 11 and the guide layer 2 (which has unfolded).

The composite layer formed by the first flexible, sheet-like guide element 11 and the guide layer 2 has a greater expansion than the second sheet-like protective element 12, considered on its own.

FIG. 3 shows the airbag device of FIGS. 1a, 1b and 2 fitted in a motor vehicle as a passenger airbag module, according to an exemplary embodiment. The airbag G has unfolded from the module housing M. The module housing M is arranged in an instrument panel T of the motor vehicle such that it is positioned between the windshield W and a vehicle occupant to be protected. Therefore, the composite layer formed from the first sheet-like protective element 11 and the guide layer 2 flanks the airbag G on the side facing the vehicle occupant to be protected. Additionally, the second sheet-like protective element 12 flanks the airbag G on the side facing the windshield.

As a result of forces exerted during the unfolding and expansion of the airbag G, the fixing of the second end portion 22 of the guide layer 2 to the second flexible protective element 12 is released. More particularly, the clamping forces that held the tabs 22a in the associated slots 12a have been overcome. Thus, the second end portion 22 of the guide layer 2 forms a free end portion of the composite layer formed from the first sheet-like protective element 11 and the guide layer 2.

Further, the vehicle occupant (passenger) to be protected is shown in a position such that the occupant's head K is located too close to the airbag module. Further, airbag G is shown unfolding from the module housing M. When the expanding airbag G unfolds and rubs along the head K of a vehicle occupant during inflation, a large force acts in the neck region N of the vehicle occupant. As a result, there is an increased risk of injuries in the neck region N of the vehicle occupant.

To prevent injuries to the neck region N of a vehicle occupant, a composite layer formed by the first flexible protective element 11 and the guide layer 2 is included. The composite layer extends between the casing of the airbag G and the head of the vehicle occupant. The composite layer formed by the first sheet-like protective element 11 and the guide layer 2 covers the head K of the vehicle occupant in the regions facing the airbag G. Further, a sliding surface is formed that the airbag G may slide along during unfolding and expansion, without the casing coming into direct contact with the head K of the vehicle occupant. Furthermore, the surface of the composite layer 2, 11 facing the casing of the airbag G, is layered such that the expanding airbag may slide with as little friction as possible along the composite layer 2, 11. Therefore forces acting on the neck region N of the motor vehicle occupant are considerably reduced. Thus, the risk of injuries to the neck region N are reduced. Additionally, the composite layer 2, 11 may be supported on the obstruction to be covered, for example on the head K of a vehicle occupant.

The expansion of the guide layer 2 may be selected such that the composite layer 2, 11 and the first sheet-like protective element 11 may cover obstructions occurring during the unfolding of the airbag G on the side facing the vehicle interior (the vehicle occupant to be protected). Further, direct contact of an obstruction with the casing of the airbag G may be avoided. Thus, as shown in FIG. 1a, the guide layer 2 is folded into a corresponding number of folds. As a result, the guide layer 2 may be arranged between the airbag G and the flexible protective covering 1.

Further, in order to ensure a low coefficient of friction, a coating may be used on a surface facing an expanding airbag G. For example, if the material used for guide layer 2 and/or first flexible protective element does not have a low coefficient of friction, then a coating may be applied. More particularly, a coating may be applied on a surface facing the expanding airbag G. Thus, improved sliding ability may be ensured.

Figure 4:
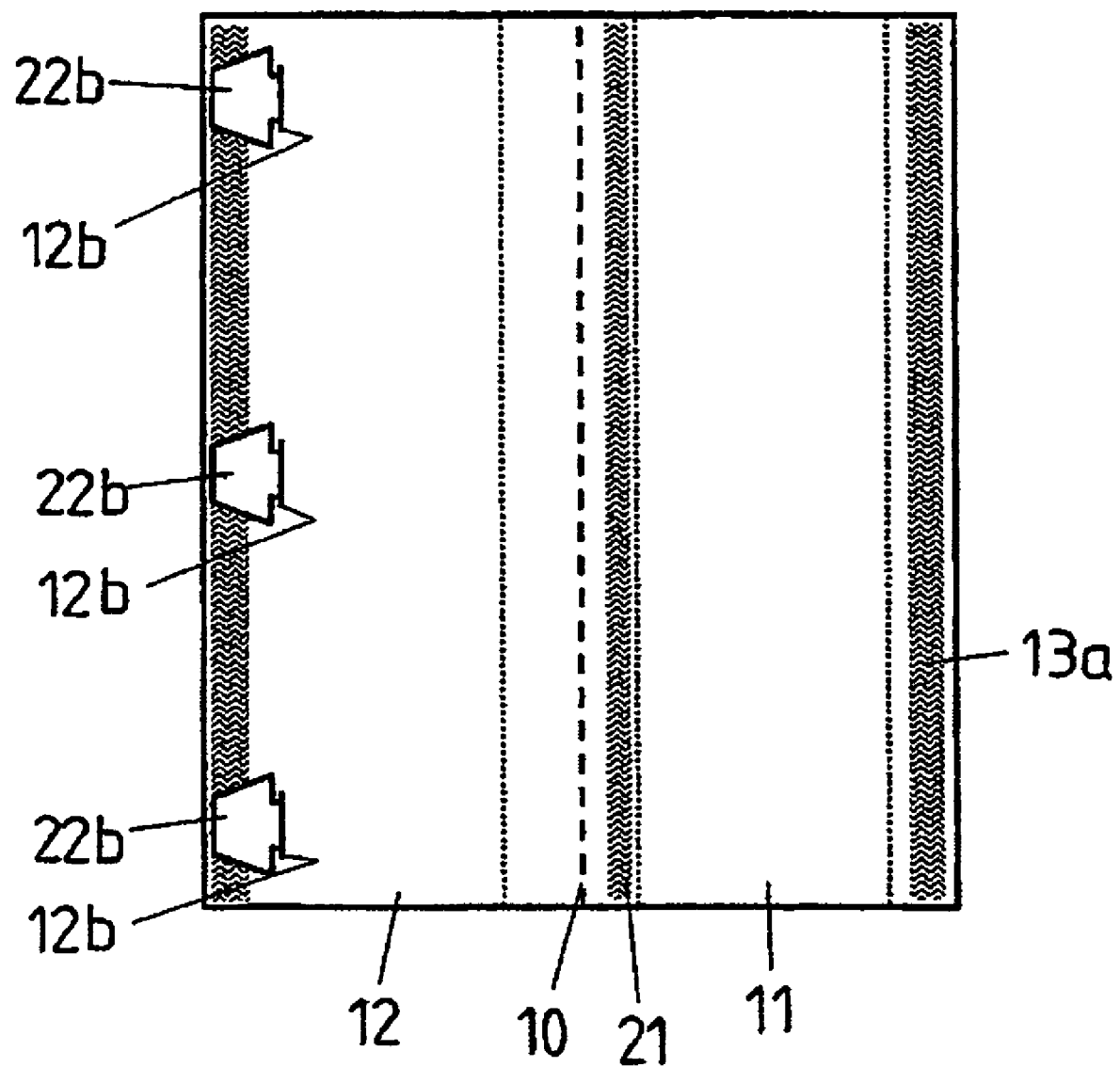
FIG. 4 shows a modification of the arrangement of FIG. 1b, according to an exemplary embodiment.

FIG. 4 shows a plan view of a modification of the airbag device of FIGS. 1a and 1b, according to an exemplary embodiment. The releasable fixing of the second end portion 22 of the guide layer 2 on the second sheet-like protective element 12 is in the region of the fastening portion B2 of the module housing M. According to FIG. 4, tabs 22b included on the second end portion 22 of the guide layer 2 that have a widened portion are used, such that the tabs 22b engage behind the associated slots 12b of the second sheet-like protective element 12. The fixing is released when the compressive forces exerted by the unfolding and expanding airbag on the guide layer 2 are sufficiently large to pull the widened tabs 12b through the associated slots 12b of the second sheet-like protective element 12. When the fixing is released during inflation of the airbag G is dependent on which forces are required in order to release the connection between the tabs 22b and the associated slots 12b (e.g. pull the widened tabs 22b through the slots 12b). Further, the force required to release the connection between tabs 22b and associated slots 12b depends on the width of the tabs 22b in relation to the expansion of the slots 12b in the direction of the width of the tabs 22b. Thus, the time of the release of the connection between the tabs 22b and the associate slots 12b may be set by selecting the geometric relationships of the tabs 22b and slots 12b.

The priority application, Germany Patent Application No. 20 2006 009 205.6, filed Jun. 7, 2006 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An apparatus for an airbag device for a motor vehicle, comprising:
   an airbag configured to be inflated to protect a vehicle occupant;
   a receptacle in which the airbag is arranged as an airbag package and that includes an outlet opening through which the airbag during inflation may emerge from the receptacle and expand; and
   a flexible protective covering that covers the airbag package in the region of the outlet opening;
   wherein the protective covering comprises:
      at least two flexible, sheet protective elements secured to the receptacle;
   wherein the flexible, sheet protective elements are connected to one another via at least one separable tearing line and that flank the airbag during inflation at least during a first period of time of the expansion of the airbag;
   wherein between the protective covering and the airbag provided as an airbag package, a flexible guide layer is arranged that is permanently connected to a first of the sheet protective elements, such that the first sheet protective element, together with the guide layer, forms a composite layer flanking the airbag during inflation of the airbag, wherein the composite layer formed by the guide layer and the first protective element has a greater expansion flanking the unfolding airbag during inflation than the first protective element has alone,
   wherein the guide layer is permanently connected to the first sheet protective element along a connecting line that extends along the tearing line,
   wherein the connecting line connecting the guide layer to the first sheet protective element is positioned closer to the tearing line than to a connecting portion of the first sheet protective element via which the first sheet protective element is secured to the receptacle in which the airbag is arranged.

2. The airbag device of claim 1, wherein the sheet protective elements are secured to fastening portions of the receptacle that substantially oppose one another.

3. The airbag device of claim 1, wherein the sheet protective elements are secured to the respectively associated fastening portion of the receptacle by an adhesive means.

4. The airbag device of claim 1, wherein the at least one tearing line of the protective covering is configured such that the protective covering during inflation and expansion of the airbag is separated along the one tearing line into separate sheet protective elements that respectively flank the airbag during expansion.

5. The airbag device of claim 1, wherein the guide layer is connected at a first end portion permanently to the first sheet protective element.

6. The airbag device of claim 1, wherein the guide layer adjacent to the tearing line is permanently connected to the first sheet protective element.

7. The airbag device as claimed in claim 1, wherein the composite layer includes a surface facing the airbag having a coefficient of friction of less than 0.1 and wherein no friction reducing layer is arranged on the surface facing the airbag.

8. The airbag device of claim 1, wherein the composite layer comprises a friction-reducing coating on a surface facing the airbag.

9. The airbag device of claim 1, wherein the surface of the composite layer facing the airbag, during cooperation with the casing of the airbag has a coefficient of friction of less than 0.1.

10. The airbag device of claim 1, wherein, during unfolding and expansion, the airbag slides along the composite layer with its casing.

11. The airbag device of claim 1, wherein the guide layer is folded between the airbag provided as an airbag package and the protective covering.

12. The airbag device of claim 1, wherein the airbag device is configured as a front airbag module.

13. The airbag device of claim 1, wherein the airbag device is configured as a passenger airbag module.

14. The airbag device of claim 1, wherein a first end portion of the first protective element is connected to the receptacle, and wherein the connecting line extends adjacent to a second end portion of the first protective element opposite to the first end portion.

15. The airbag device of claim 1, wherein the guide layer is permanently connected to the first sheet protective element so that the composite layer formed thereby and flanking the airbag during inflation and expansion, faces an occupant to be protected by the airbag.

16. The airbag device of claim 15, wherein during inflation of the airbag the composite layer is configured to rest over a body part of the occupant who is located close to the casing of the airbag.

17. The airbag device of claim 1, wherein the tearing line is formed by a material weakness of the protective covering.

18. The airbag device of claim 17, wherein the tearing line is formed by a perforation of the protective covering.

19. The airbag device of claim 1, wherein the tearing line is formed by a separable connection of the sheet protective elements.

20. The airbag device of claim 19, wherein the tearing line is formed by a tear seam.

21. The airbag device of claim 1, wherein the permanent connection between the guide layer and the first sheet protective element of the protective covering is a material connection.

22. The airbag device of claim 21, wherein the permanent connection is configured as a bonded or welded connection.

23. The airbag device of claim 1, wherein the guide layer is releasably fixed in the receptacle via a fixing portion.

24. The airbag device of claim 23, wherein the fixing portion is formed by a second end portion of the guide layer.

25. The airbag device of claim 23, wherein the fixing portion is spaced apart from the connecting line, via which the guide layer is permanently connected to the first sheet protective element of the protective covering.

26. The airbag device of claim 23, wherein positive fixing means are provided for the releasable fixing of the guide layer.

27. The airbag device of claim 23, wherein the releasable fixing of the guide layer is provided on the protective covering.

28. The airbag device of claim 27, wherein the releasable fixing of the guide layer is provided on a second sheet protective element of the protective covering to which the guide layer is not permanently connected.

29. The airbag device of claim 23, wherein a releasable fixing of the fixing portion of the guide layer in the receptacle is released so that the fixing portion is released during inflation and expansion of the airbag and forms a free end of the composite layer flanking the airbag.

30. The airbag device of claim 29, wherein the releasable fixing of the guide layer is configured so that the fixing portion in the receptacle is only released when the two sheet protective elements have already been separated from one another along the tearing line of the protective covering.

31. The airbag device of claim 23, wherein the releasable fixing of the guide layer comprises a tearing mechanism.

32. The airbag device of claim 31, wherein the tearing mechanism comprises a tear seam.

33. An apparatus for an airbag device for a motor vehicle, comprising:
an airbag configured to be inflated to protect a vehicle occupant;
a receptacle in which the airbag is arranged as an airbag package and that includes an outlet opening through which the airbag during inflation may emerge from the receptacle and expand; and
a flexible protective covering that covers the airbag package in the region of the outlet opening;
wherein the protective covering comprises:
at least two flexible, sheet protective elements secured to the receptacle;
wherein the flexible, sheet protective elements are connected to one another via at least one separable tearing line and that flank the airbag during inflation at least during a first period of time of the expansion of the airbag;
wherein between the protective covering and the airbag provided as an airbag package, a flexible guide layer is arranged that is permanently connected to a first of the sheet protective elements, such that the first sheet protective element, together with the guide layer, forms a composite layer flanking the airbag during inflation of the airbag,
wherein the guide layer is permanently connected to the first sheet protective element along a connecting line that extends along the tearing line,
wherein the guide layer is releasably fixed in the receptacle via a fixing portion,
wherein the releasable fixing of the guide layer comprises a tearing mechanism, and
wherein the tearing mechanism comprises an adhesive.

34. An apparatus for an airbag device for a motor vehicle, comprising:
an airbag configured to be inflated to protect a vehicle occupant;
a receptacle in which the airbag is arranged as an airbag package and that includes an outlet opening through which the airbag during inflation may emerge from the receptacle and expand; and
a flexible protective covering that covers the airbag package in the region of the outlet opening;
wherein the protective covering comprises:
at least two flexible, sheet protective elements secured to the receptacle;
wherein the flexible, sheet protective elements are connected to one another via at least one separable tearing line and that flank the airbag during inflation at least during a first period of time of the expansion of the airbag;
wherein between the protective covering and the airbag provided as an airbag package, a flexible guide layer is arranged that is permanently connected to a first of the sheet protective elements, such that the first sheet protective element, together with the guide layer, forms a composite layer flanking the airbag during inflation of the airbag,
wherein the guide layer is permanently connected to the first sheet protective element along a connecting line that extends along the tearing line,
wherein the guide layer is releasably fixed in the receptacle via a fixing portion,
wherein positive fixing means are provided for the releasable fixing of the guide layer, and
wherein the fixing means comprises at least one tab penetrating an associated slot.

35. The airbag device of claim 34, wherein the tab is non-positively held in a position, in which the tab passes through the associated slot.

36. The airbag device of claim 34, wherein the tab has a widened portion, wherein an edge of the widened portion positively engages behind the associated slot.

* * * * *